(12) United States Patent
Lin et al.

(10) Patent No.: US 11,682,136 B2
(45) Date of Patent: Jun. 20, 2023

(54) DISPLAY METHOD, DISPLAY SYSTEM AND NON-TRANSITORY COMPUTER READABLE STORAGE MEDIUM

(71) Applicant: HTC Corporation, Taoyuan (TW)

(72) Inventors: Sheng-Cherng Lin, Taoyuan (TW); Kuan-Wei Li, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/447,063

(22) Filed: Sep. 7, 2021

(65) Prior Publication Data
US 2022/0215575 A1 Jul. 7, 2022

Related U.S. Application Data

(60) Provisional application No. 63/134,593, filed on Jan. 7, 2021.

(51) Int. Cl.
*G06T 7/73* (2017.01)
*G06T 11/00* (2006.01)
(Continued)

(52) U.S. Cl.
CPC .............. *G06T 7/73* (2017.01); *G06F 3/012* (2013.01); *G06T 11/00* (2013.01); *G06V 20/46* (2022.01);
(Continued)

(58) Field of Classification Search
CPC . G06T 7/73; G06T 11/00; G06T 2207/30196; G06T 2207/30204;
(Continued)

(56) References Cited

U.S. PATENT DOCUMENTS

2015/0128075 A1\* 5/2015 Kempinski ............. G06F 3/012
715/765
2016/0148434 A1\* 5/2016 Blonde ................... G06F 3/012
345/633
(Continued)

FOREIGN PATENT DOCUMENTS

CN 109643466 A 4/2019
CN 109937393 A 6/2019
(Continued)

OTHER PUBLICATIONS

Corresponding Taiwan office action dated Jun. 7, 2022.

*Primary Examiner* — Jin Ge
(74) *Attorney, Agent, or Firm* — CKC & Partners Co., LLC

(57) ABSTRACT

A display method for displaying a virtual object, comprising: by at least one processor, recognizing characteristics of a main object from a video; by the at least one processor, recognizing a first fixed object from the video; by the at least one processor, determining a first target point in the video according to the characteristics of the main object; by the at least one processor, calculating a first position relationship between the first fixed object and the first target point; by the at least one processor, determining an anchor point in a virtual environment; and by the at least one processor, controlling a display device to display the virtual object at a second target point in the virtual environment by setting a second position relationship corresponding to the first position relationship between the anchor point and the second target point.

19 Claims, 12 Drawing Sheets

(51) Int. Cl.
  *G06F 3/01* (2006.01)
  *G06V 20/40* (2022.01)
  *G06V 40/10* (2022.01)

(52) U.S. Cl.
  CPC .... *G06V 40/10* (2022.01); *G06T 2207/30196* (2013.01); *G06T 2207/30204* (2013.01); *G06V 2201/07* (2022.01)

(58) Field of Classification Search
  CPC .... G06V 20/46; G06V 40/10; G06V 2201/07; G06F 3/012
  USPC ........................................................ 345/633
  See application file for complete search history.

(56) References Cited

U.S. PATENT DOCUMENTS

| | | | |
|---|---|---|---|
| 2016/0291329 A1* | 10/2016 | Kimura | G06F 3/04815 |
| 2017/0270715 A1* | 9/2017 | Lindsay | G06T 7/70 |
| 2019/0088027 A1 | 3/2019 | Viseh | |
| 2019/0340833 A1* | 11/2019 | Furtwangler | G06F 3/011 |
| 2020/0193668 A1 | 6/2020 | Zises | |
| 2020/0312282 A1* | 10/2020 | Akagawa | G09G 5/38 |
| 2020/0400954 A1* | 12/2020 | Tanaka | G06F 3/012 |

FOREIGN PATENT DOCUMENTS

| | | |
|---|---|---|
| CN | 110069125 A | 7/2019 |
| CN | 110728740 A | 1/2020 |
| CN | 110941327 A | 3/2020 |
| JP | 6394165 B2 | 9/2018 |
| TW | 201631960 A | 9/2016 |

\* cited by examiner

DISPLAY METHOD, DISPLAY SYSTEM AND NON-TRANSITORY COMPUTER READABLE STORAGE MEDIUM

CROSS-REFERENCE TO RELATED APPLICATION

This application claims priority to U.S. Provisional Application Ser. No. 63/134,593, filed on Jan. 7, 2021, which is herein incorporated by reference.

BACKGROUND

Field of Invention

This disclosure relates to a display method and system, and in particular to a display method and system for dynamically displaying the virtual object.

Description of Related Art

In the application of AR (augmented reality), multiple virtual contents for providing to a user are overlapped on top of the real scene. For simulating real world objects, the virtual contents in AR stay at fixed positions in reference to the real scene generally. For example, a virtual display screen may hold a pose thereof (e.g., stay on a surface of a real table) when the user changes in position or turns into a different direction, in order to simulate a real display device. In this case, when the user is following a video played by the virtual display screen to do a physical activity (e.g., fitness) that requires the user to change in posture, the user has to reposition the virtual display screen into his/her visual field by, for example, operating a controller, if the virtual display screen leaves the visual field. It is inconvenient for the user to reposition the virtual contents in AR while the user is doing the physical activity, causing AR products have less chance to be considered as alternatives to mobile devices (e.g., smart phone or tablet) capable of providing audio and visual instructions.

SUMMARY

An aspect of present disclosure relates to a display method for displaying a virtual object. The display method includes: by at least one processor, recognizing characteristics of a main object from a video; by the at least one processor, recognizing a first fixed object from the video; by the at least one processor, determining a first target point in the video according to the characteristics of the main object; by the at least one processor, calculating a first position relationship between the first fixed object and the first target point; by the at least one processor, determining an anchor point in a virtual environment; and by the at least one processor, controlling a display device to display the virtual object at a second target point in the virtual environment by setting a second position relationship between the anchor point and the second target point, wherein the second position relationship is corresponding to the first position relationship.

Another aspect of present disclosure relates to a display system. The display system includes a display device and at least one processor. The display device is configured to display a virtual object. The at least one processor is coupled to the display device and is configured to: recognize characteristics of a main object from a video; recognize a first fixed object from the video; determine a first target point in the video according to the characteristics of the main object; calculate a first position relationship between the first fixed object and the first target point; determine an anchor point in a virtual environment; and control the display device to display the virtual object at a second target point in the virtual environment by setting a second position relationship between the anchor point and the second target point, wherein the second position relationship is corresponding to the first position relationship.

Another aspect of present disclosure relates to a non-transitory computer readable storage medium with a computer program to execute a display method for displaying a virtual object, wherein the display method includes: by at least one processor, recognizing characteristics of a main object from a video; by the at least one processor, recognizing a first fixed object from the video; by the at least one processor, determining a first target point in the video according to the characteristics of the main object; by the at least one processor, calculating a first position relationship between the first fixed object and the first target point; by the at least one processor, determining an anchor point in a virtual environment; and by the at least one processor, controlling a display device to display the virtual object at a second target point in the virtual environment by setting a second position relationship between the anchor point and the second target point, wherein the second position relationship is corresponding to the first position relationship.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

As used herein, "coupled" and "connected" may be used to indicate that two or more elements physical or electrical contact with each other directly or indirectly, and may also be used to indicate that two or more elements cooperate or interact with each other.

Figure 1:
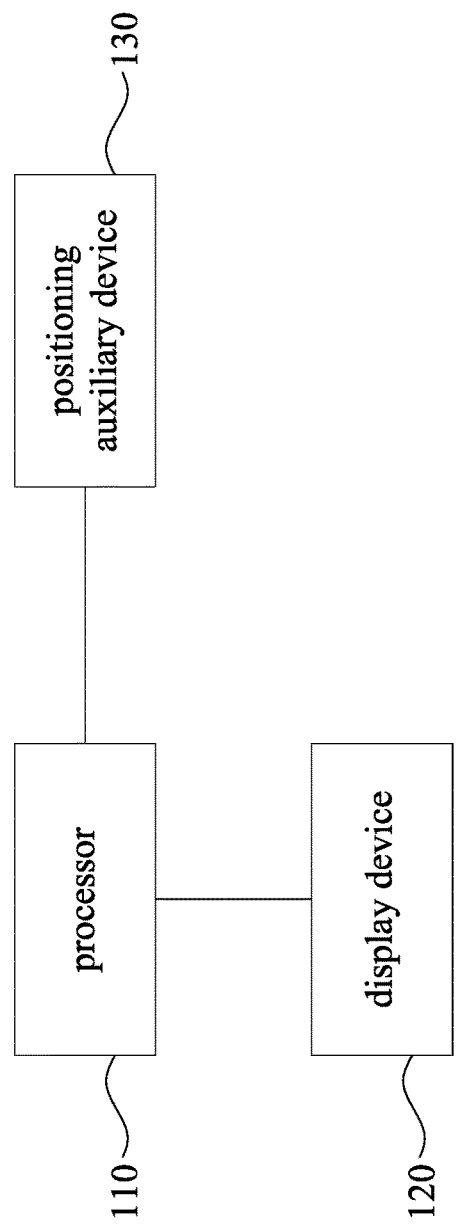
FIG. 1 is a block diagram of the display system in accordance with some embodiments of the present disclosure.
Figure 5A:
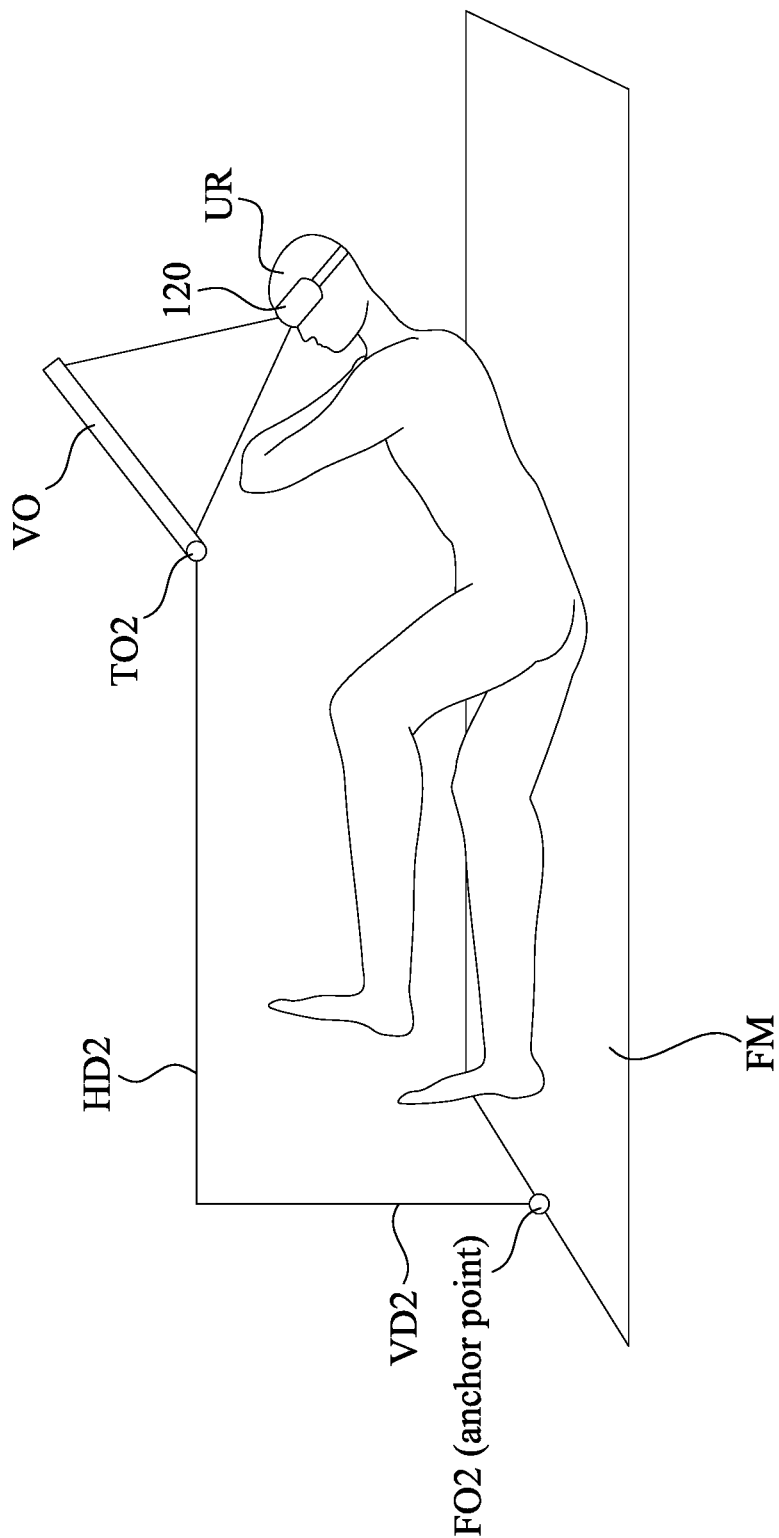
FIGS. 5A-5B are schematic diagrams of the operation of the display system in accordance with some embodiments of the present disclosure.
Figure 5B:
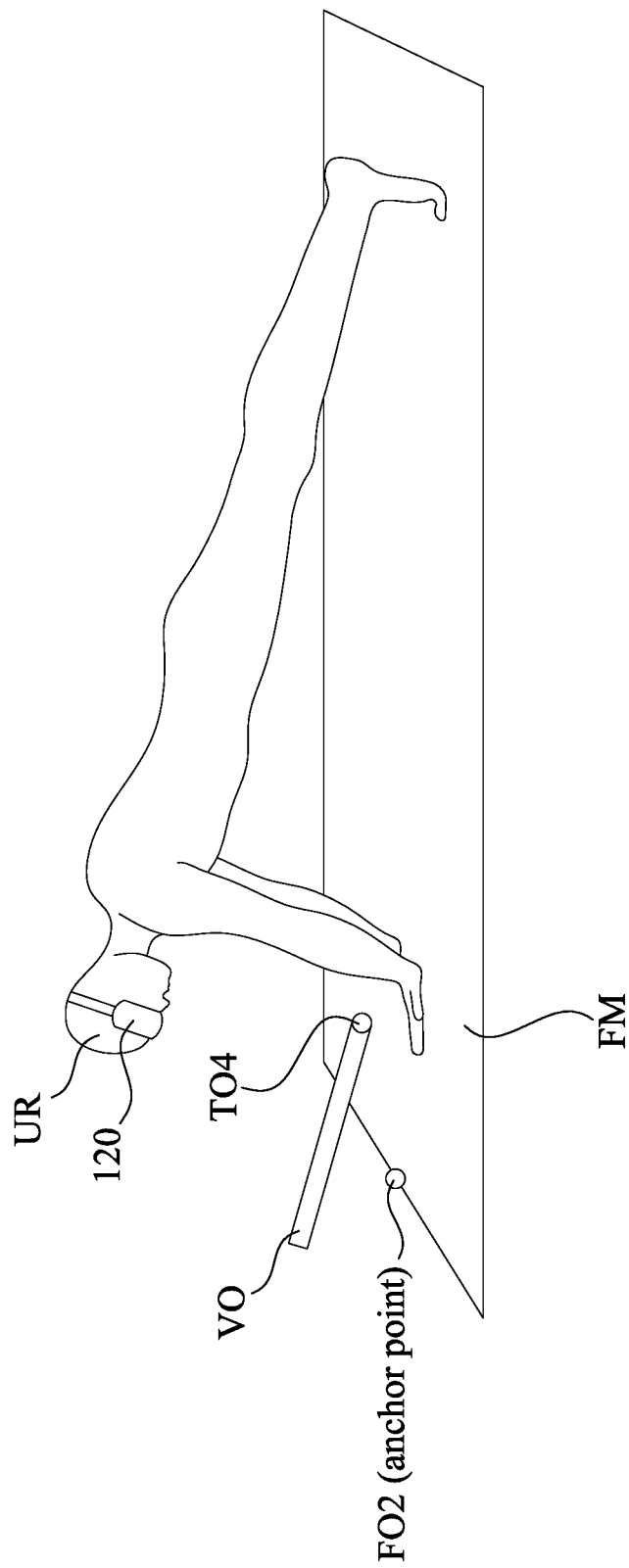

Referring to FIG. 1, FIG. 1 depicts a display system 100 in accordance with some embodiments of the present disclosure. The display system 100 includes a processor 110, a display device 120 and a positioning auxiliary device 130. The processor 110 is coupled to the display device 120 and the positioning auxiliary device 130. In some embodiments, the display device 120 is a wearable device, such as a head mounted device (HMD). The processor 110 is configured to analyze a video to control the display device 120 to display a virtual object VO (as shown in FIGS. 5A and 5B mentioned later) which displays the video analyzed by the processor 110 in a virtual environment, in which a position of the virtual object VO is determined by the processor 110 based on an analyzation result in respect to the video. The virtual object VO may be two-dimensional, for example, a virtual display screen. In such way, the user UR (as shown in FIGS. 5A and 5B mentioned later) can follow the instructions of the video by viewing the virtual object VO through the display device 120.

In some embodiments, the processor 110 is implemented by one or more central processing unit (CPU), application-specific integrated circuit (ASIC), microprocessor, system on a Chip (SoC) or other suitable processing units. It can be appreciated that the processor 110 can be a server independent from the display device 120 and transmit the video and the analyzation result in respect to the video to the display device 120 through network, and the display device 120 may include other processor(s) (not shown in FIG. 1) configured to generate the virtual object VO according to the analyzation result. On the other hand, the processor 110 may be integrated in the display device 120, that is, the display device 120 may be an all-in-one HMD.

In some embodiments, the positioning auxiliary device 130 is placed in a physical environment and configured to emit invisible light (i.e., perform an interaction operation in a physical environment). In some embodiments, the positioning auxiliary device 130 may be implemented by one or more base stations for forming a tracking system. One or more receptors can be provided on the display device 120 to receive or intercept the invisible light, so as to generate positioning data. The processor 110 or the display device 120 is configured to calculate an initial position of the display device 120 in the physical environment according to the positioning data, and to convert the initial position of the display device 120 to a reference point in the virtual environment for determining the position of the virtual object VO in the virtual environment, which will be further described in the following paragraphs.

In other embodiments, the positioning auxiliary device 130 is configured to capture at least one photograph in the physical environment (i.e., perform an interaction operation in a physical environment), that is, the positioning auxiliary device 130 may include one or more cameras. If a marker (e.g., a QR code) is provided in the physical environment, the at least one photograph generated by the positioning auxiliary device 130 may include an image of the marker. In response to a reception of the at least one photograph generated by the positioning auxiliary device 130, the processor 110 or the display device 120 may take the at least one photograph as positioning data and calculate the position of the marker in the physical environment by, for example, calculating a size and a location of the image of the marker in the at least one photograph. In such way, the position of the marker can be converted to a reference point in the virtual environment for determining the position of the virtual object VO in the virtual environment, which will be further described in the following paragraphs. If there is no marker in the physical environment, the processor 110 is configured to determine the reference point (e.g., FO2 as shown in FIG. 5A or 5B) in the virtual environment by, for example, image recognition by comparing the video analyzed by the processor 110 with the at least one photograph captured by the positioning auxiliary device 130, which will be further described in the following paragraphs.

Figure 2:
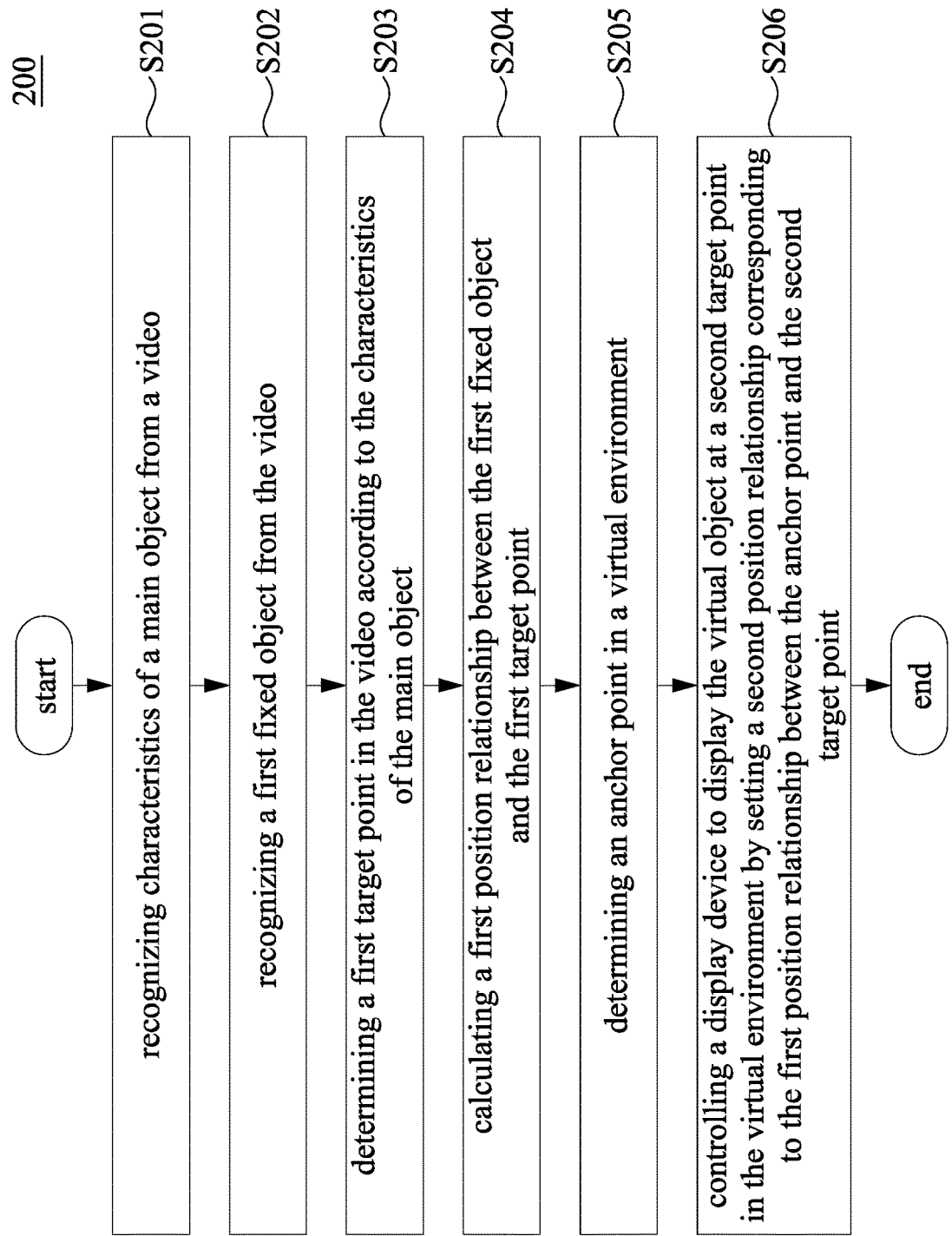
FIG. 2 is a flow diagram of the display method in accordance with some embodiments of the present disclosure.

Referring to FIG. 2, FIG. 2 depicts a display method 200 in accordance with some embodiments of the present disclosure. The display method 200 can be performed by the processor 110 of FIG. 1. However, the present disclosure should not be limited thereto. As shown in FIG. 2, the display method 200 includes operations S201-S206. Operations S201-S206 would be described in detail below with reference to FIG. 4.

Before performing the display method 200, the processor 110 receives the video to be analyzed by the processor 110 in one of multiple ways. In some embodiments, the video is stored in a memory (not shown) of the display system 100, so that the processor 110 can access the video through the memory. In other embodiments, the video is streamed over a network, so that the processer 110 can receive the video from the network.

Figure 4:
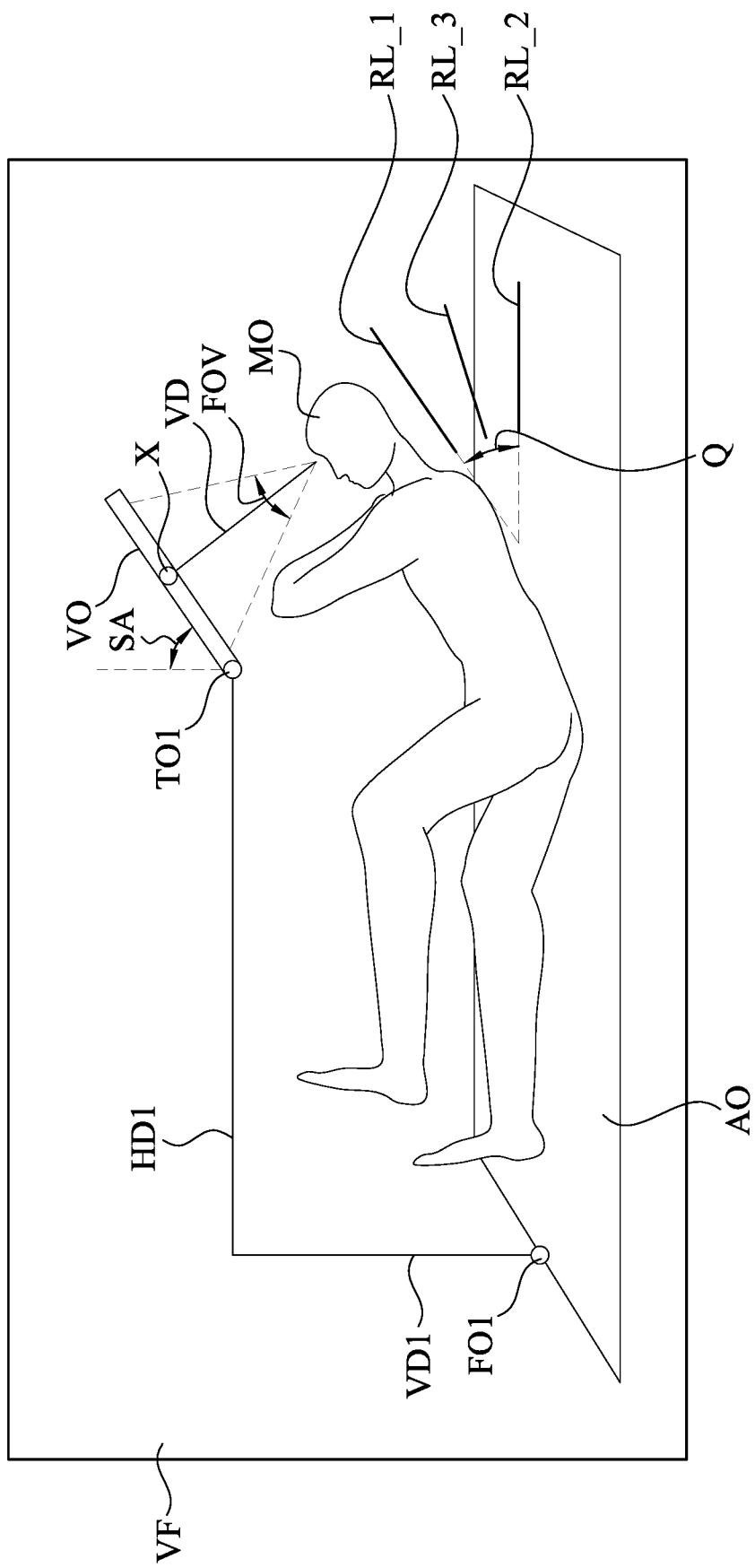
FIG. 4 is a schematic diagram of the frame of the video which is analyzed by the display system in accordance with some embodiments of the present disclosure.

Referring to FIG. 4, FIG. 4 depicts a frame VF of the video to be analyzed by the processor 110 in accordance with some embodiments of the present disclosure. As shown in FIG. 4, the video shows a main object MO with an action (or a posture) on an accessory object AO. For example, a human figure (i.e., the main object MO) in the video is doing physical activities (e.g., fitness or yoga) on an exercise mat (i.e., the accessory object AO).

In operation S201, the processor 110 recognizes characteristics of the main object MO from the video. In some embodiments, the characteristics of the main object MO are corresponding to a section above shoulders of the human figure. That is, the section may include a head and a neck of the human figure. It can be appreciated that the processor 110 can recognize the characteristics of the main object MO by the technology of three-dimensional object recognition.

In operation S202, the processor 110 recognizes a first fixed object FO1 from the video. As shown in FIG. 4, the first fixed object FO1 may be a marker on the accessory object AO, or is predetermined to be a center point of a left short edge of the accessory object AO. However, the present disclosure is not limited herein. The first fixed object FO1 can be determined to be at another point (e.g., a corner) of the accessory object AO or other suitable points in the video (e.g., a center of eyes of the human figure).

Figure 3:
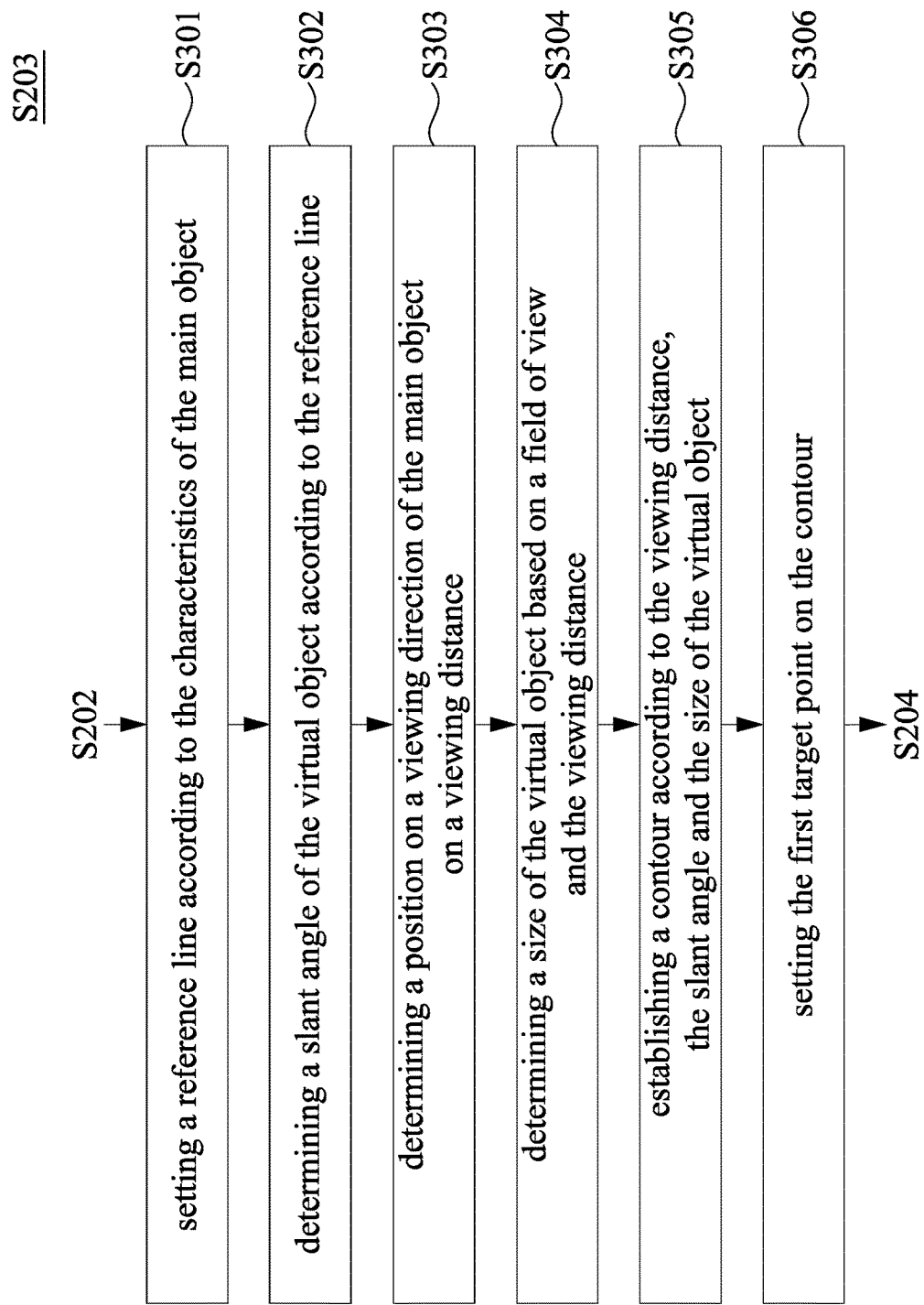
FIG. 3 is a flow diagram of one operation of the display method in accordance with some embodiments of the present disclosure.

In operation S203, the processor 110 determines a first target point TO1 (as shown in FIG. 4) in the video according to the characteristics of the main object MO. A first position relationship between the first fixed object FO1 and the first target point TO1 is used to determining the position of the virtual object VO in the virtual environment, which will be further described in the following paragraphs. Referring to FIG. 3, FIG. 3 is a flow diagram of operation S203. As shown in FIG. 3, operation S203 includes sub-operations S301-S306.

In sub-operation S301, the processor 110 sets a reference line according to the characteristics of the main object MO. In some embodiments, the main object MO in the video maintains a posture for a period of time. If the main object MO maintains the posture as shown in FIG. 4, the processor 110 would set a first line RL_1 as the reference line, wherein the first line RL_1 is set from a first point at a lower end of the neck of the human figure to a second point above the head of the human figure, that is, the first line RL_1 may substantially be a connection line between the shoulder and the back of the head of the human figure.

In other embodiments, the main object MO in the video repetitively changes the posture from a first posture (e.g., the crunches posture of the main object MO in FIG. 4) to a second posture (e.g., the main object MO lies on the accessory object AO). A posture change of the main object MO brings a corresponding change on the characteristics of the main object MO. For example, the characteristics of the main object MO are moved repetitively from a first position to a second position. In such condition, if the main object MO has the first posture, the processor 110 sets the first line RL_1 (as shown in FIG. 4) according to the characteristics at the first position corresponding to the first posture of the main object MO. If the main object MO has the second posture, the processor 110 sets a second line RL_2 (as shown in FIG. 4) according to the characteristics at the second position corresponding to the second posture of the main object MO. It can be appreciated that the first line RL_1 is intersected by the second line RL_2 to form an angle Q. After setting the first line RL_1 and the second line RL_2, the processor 110 searches a third line RL_3 that is intersected by and between the first line RL_1 and the second line RL_2. As shown in FIG. 4, the third line RL_3 equally divides the angle Q between the first line RL_1 and the second line RL_2. Accordingly, the processor 110 determines the third line RL_3 as the reference line.

In sub-operation S302, the processor 110 determines a slant angle SA of the virtual object VO to be displayed in the virtual environment as shown in FIGS. 5A-5B according to the reference line obtained in sub-operation S301. Notably, the virtual object VO does not really exist in the video analyzed by the processor 110, the virtual object VO shown in FIG. 4 is for the purpose of illustration convenience. In some embodiments, the virtual object VO is set by the processor 110 to be parallel to the reference line. Accordingly, the slant angle SA of the virtual object VO is determined to set the virtual object VO to be parallel to the reference line. For example, if the first line RL_1 is set as the reference line, the virtual object VO is arranged at the slant angle SA in reference to a vertical dash line as shown in FIG. 4, so as to be parallel to the reference line (i.e., the first line RL_1).

In sub-operation S303, the processor 110 determines a position of the first target point TO1 by first using a viewing distance VD. In the embodiment of FIG. 4, the processor 110 determines a position X on a viewing direction of the human figure (i.e., the main object MO), and the position X is separated from a center between eyes of the human figure by the viewing distance VD. In this case, the viewing distance VD may be an average arm length of humans.

In other embodiments, the processor 110 determines the position X on the viewing direction of the human figure (i.e., the main object MO) by separating the position X from the reference line (e.g., the first line RL_1) by the viewing distance VD. In this case, the viewing distance VD may be a sum of the average arm length of humans and an average head diameter of humans.

In sub-operation S304, the processor 110 determines a size of the virtual object VO based on a field of view FOV and the viewing distance VD. It can be appreciated that after the slant angle SA is determined, the processor 110 can determine the size of the virtual object VO by setting the virtual object VO in the field of view FOV with the slant angle SA and separating from an endpoint of the field of view FOV by the viewing distance VD, and further by expending the virtual object VO to the edges of the field of view FOV. In some embodiments, the viewing distance VD and the field of view FOV are predetermined to provide a comfortable viewing experience for the user MR. In other embodiments, the average arm length of humans, the average head diameter of humans and the field of view FOV of humans may be stored in the memory of the display system 100 in advance.

In sub-operation S305, the processor 110 determines the position of the first target point TO1 by further establishing a contour according to the viewing distance VD, the slant angle SA and the size of the virtual object VO. Although the virtual object VO does not really exist in the video of FIG. 4 and is depicted only for illustration convenience, the said contour can be represented by the edges of the virtual object VO in FIG. 4 for simplifying the figure. In some embodiments, the contour is a rectangle. That is, the contour includes four edges (e.g., an upper edge, a lower edge, a left edge, a right edge), and each of the four edges is perpendicular to two edges connected thereto. It can be appreciated that FIG. 4 shows one (e.g., the left edge) of the four edges only.

In sub-operation S306, the processor 110 sets the first target point TO1 on the contour. The first target point TO1 in FIG. 4 is illustrated at a lower end of the left edge of the contour for better understanding. In some embodiments, the first target point TO1 is set at a center of the lower edge of the contour. However, the present disclosure is not limited herein. The first target point TO1 can be set at any suitable point on the contour.

In operation S204, after the first fixed object FO1 and the first target point TO1 are determined, the processor 110 calculates the first position relationship between the first fixed object FO1 and the first target point TO1. As shown in FIG. 4, in some embodiments, the processor 110 calculates a length of a vertical distance VD1 and a length of a horizontal distance HD1 to obtain the first position relationship between the first fixed object FO1 and the first target point TO1.

Operation S205 will be described in reference with FIG. 5A. FIG. 5A depicts that the user UR is doing one of the physical activities on an exercise mat FM in the physical environment, by following instructions of the video of FIG. 4. The virtual object VO provided to the user UR in the virtual environment is depicted in the physical environment of FIG. 5A for illustration convenience. In practice, the virtual object VO is provided by the display device 120 to the user UR only, and cannot be directly seen by others in the physical environment. In operation S205, when the user UR mounts the display device 120, the processor 110 identifies a second fixed object FO2 in the physical environment, in which the position of the second fixed object FO2 is converted by the processor 110 to an anchor point in the virtual environment for thereafter determining the position of the virtual object VO.

In some embodiments, before operation S205 is performed, a marker for interacting with the positioning auxiliary device 130 is set at the center of the left short edge of the exercise mat FM (i.e., the position corresponding to the position of the first fixed object FO1, but this disclosure is not limited thereto). As aforementioned description, the processor 110 would obtain the position of the marker by controlling the positioning auxiliary device 130 to interact with the marker. For example, the processor 110 controls the positioning auxiliary device 130 to capture the photograph with the image of the marker. Accordingly, the processor 110 takes the marker as the second fixed object FO2 and converts the second fixed object FO2 into the anchor point in the virtual environment. The processor 110 would determine the anchor point has a position corresponding to the position of the first fixed object FO1 in the video of FIG. 4.

In other embodiments which the marker is not provided in the physical environment, the processor 110 would identify the second fixed object FO2 by image recognizing by comparing the photograph captured by the positioning auxiliary device 130 with the video of FIG. 4. In another embodiment, the marker is not provided in the physical environment, and the user UR has an initial posture (e.g., standing) same as the main object MO. In this case, the processor 110 gets the initial position of the display device 120 mounted on the user UR by controlling the positioning auxiliary device 130 to interact with the receptor on the display device 120 and sets the initial position of the display device 120 as the second fixed object FO2.

In operation S206, the processor 110 controls the display device 120 to display the virtual object VO at a second target point TO2 in the virtual environment by setting a second position relationship corresponding to the first position relationship between the anchor point and the second target object TO2. As shown in FIG. 5A, the second position relationship includes a length of a vertical distance VD2 and a length of a horizontal distance HD2 in the virtual environment. In this embodiment, the vertical distance VD2 is corresponding (e.g., same as) the vertical distance VD1 in length, and the horizontal distance HD2 is corresponding (e.g., same as) the horizontal distance HD1 in length. By adding the length of the vertical distance VD2 and the length of the horizontal distance HD2 to coordinate of the anchor point, the processor 110 determines the second target point TO2 in reference to the anchor point in the virtual environment. Accordingly, the processor 110 controls the display device 120 to display the virtual object VO with the slant angle SA according to the second target point TO2. For instance, the center of the lower edge of the virtual object VO would be overlapped with the second target point TO2. Furthermore, distance between the virtual object VO and the center between eyes of the user is substantially the viewing distance VD. It can be appreciated that the position of the second target point TO2 in the virtual environment is corresponding to the position of the first target point TO1 in the video.

Referring to FIG. 5B, FIG. 5B depicts that the user UR is doing another one of the physical activities on the exercise mat FM in the physical environment. The virtual object VO provided to the user UR in the virtual environment is depicted in the physical environment of FIG. 5B for illustration convenience, and cannot be directly seen by others in the physical environment. If the main object MO in the video changes from the posture as shown in FIG. 4 into another posture corresponding to the posture of the user UR in FIG. 5B, the processor 110 would notice that the main object MO of FIG. 4 is changed in posture by recognizing the characteristics of the main object MO. Accordingly, the processor 110 may repeatedly conduct operations S203-S204 and S206 when the main object MO of FIG. 4 changes posture thereof to determine a third target point (not shown, which can be understood as a new first target point TO1) in the video according to the characteristics of the main object MO. The processor 110 calculates a third position relationship between the first fixed object FO1 and the third target point (i.e., the new target point TO1). As shown in FIG. 5B, the processor 110 controls the display device 120 to display the virtual object VO at a fourth target point TO4 in the virtual environment by setting a fourth position relationship between the second fixed object FO2 and the fourth target point TO4 corresponding to the third position relationship. The descriptions of determining the third target point (i.e., the new target point TO1), calculating the third position relationship, and controlling the display device 120 to display the virtual object VO at the fourth target point TO4 are similar to those of operations S203-S204 and S206, respectively, and therefore are omitted herein.

In the above embodiments, when the user UR is doing the same physical activity as the main object MO in the video, the display system 100 is configured to display the virtual object VO at the appropriate position (e.g., in front of the face of the user MR) by recognizing the characteristics of the main object MO. However, when the user UR is, for example, in the rest and thus is different from the main object MO in posture, the virtual object VO generated by the aforesaid operations may not be displayed at the appropriate position.

Figure 6A:
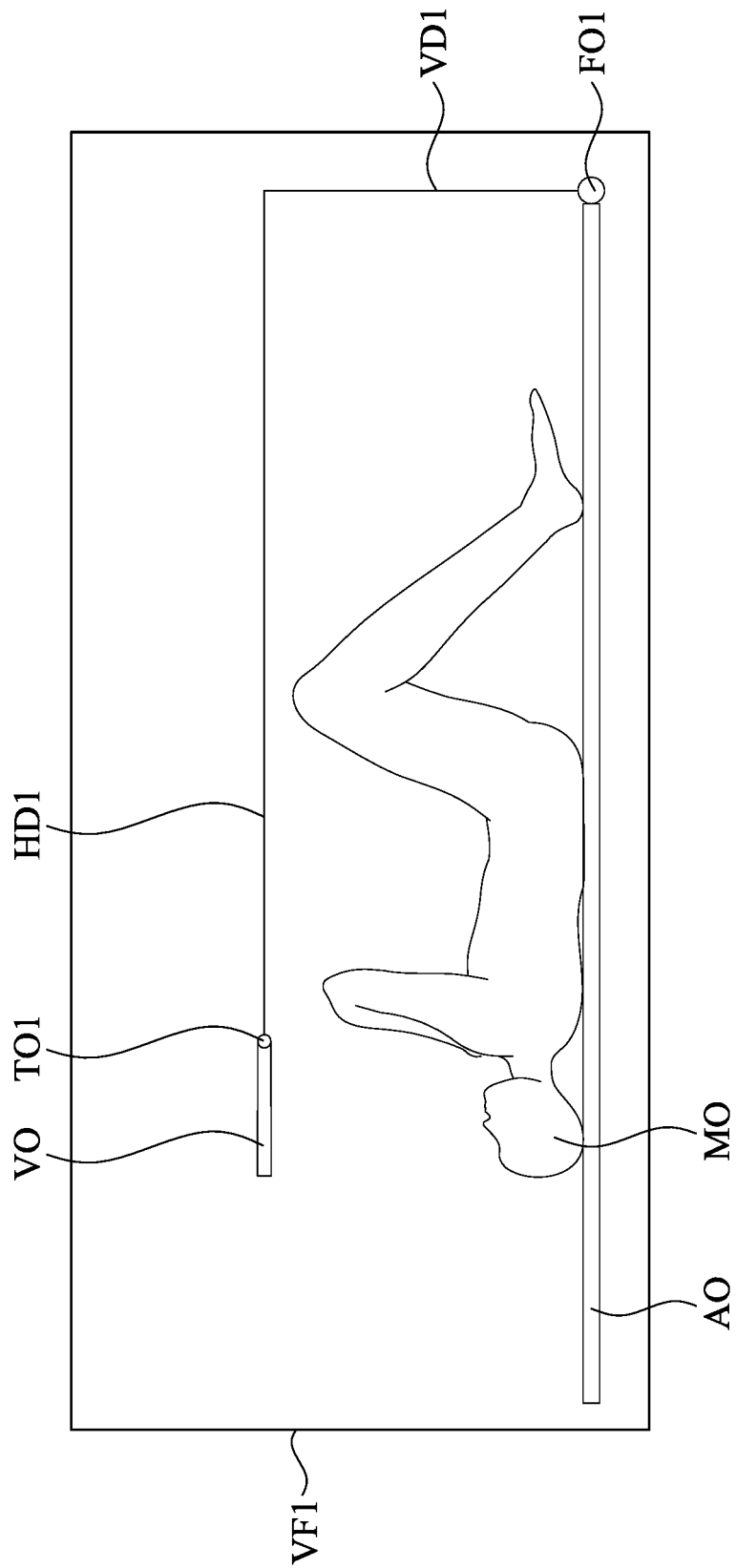
FIGS. 6A-6B are schematic diagrams of two frames of the video which is analyzed by the display system in accordance with some embodiments of the present disclosure.
Figure 6B:
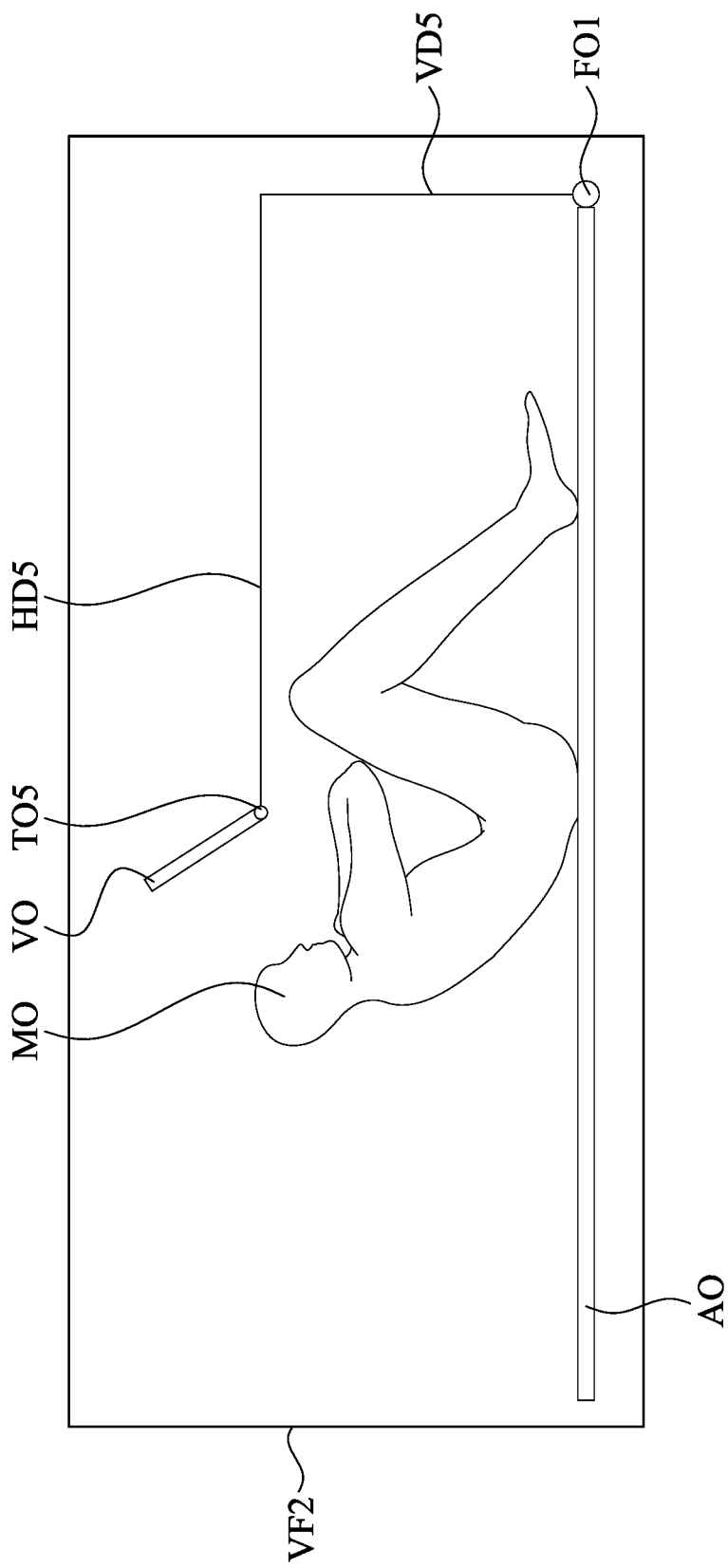

Referring to FIGS. 6A-6B, FIGS. 6A-6B depict frames of the video analyzed by the processor 110, in which the main object MO repetitively changes the posture from a first sub-posture (as shown in FIG. 6A) to a second sub-posture (as shown in FIG. 6B) belongs to a same posture (e.g., the crunches). As shown in FIG. 6A, the processor 110 determines the first fixed object FO1 and the first target point TO1 in a first frame VF1 of the video corresponding to the first sub-posture, so as to calculate the first position relationship (i.e., the length of the vertical distance VD1 and the length of the horizontal distance HD1) between the first fixed object FO1 and the first target point TO1. As shown in FIG. 6B, the processor 110 determines the first fixed object FO1 and a fifth target point TO5 in a second frame VF2 of the video corresponding to the second sub-posture, so as to calculate a fifth position relationship (i.e., a length of a vertical distance VD5 and a length of a horizontal distance HD5) between the first fixed object FO1 and the fifth target point TO5. In other words, the processor 110 determines two positions for displaying the virtual object VO according to the two sub-postures of the main object MO, by conducting operations S203-S204 and S206 for both the two sub-postures.

Figure 7A:
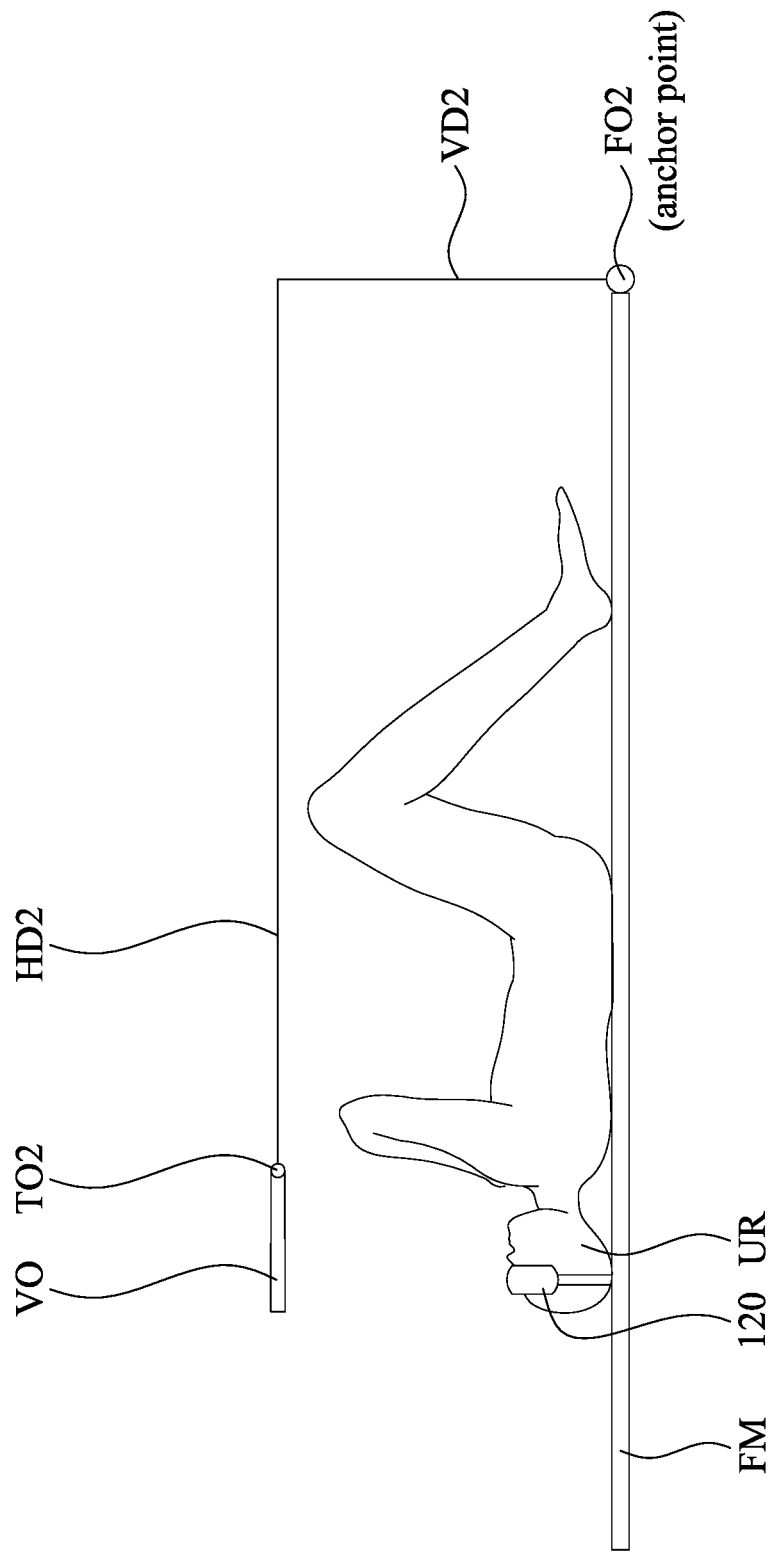
FIGS. 7A-7D are schematic diagrams of the operation of the display system in accordance with some embodiments of the present disclosure.

Referring to FIGS. 7A-7D, FIGS. 7A-7D depict that the user UR wearing the display device 120 is doing the physical activity according to the main object MO in FIGS. 6A-6B. It can be appreciated that if the user UR is doing the physical activity according to the main object MO in FIGS. 6A-6B, the display device 120 would be moved from a position shown in FIG. 7A (i.e., third position) to another position shown in FIG. 7D (i.e., fourth position). As shown in FIG. 7A, the user UR maintains at the first sub-posture same as the main object MO of the first frame VF1. If the display device 120 is at the position of FIG. 7A, the processor 110 controls the display device 120 to display the virtual object VO at the second target point TO2 in the virtual environment by setting the second position relationship (i.e., the length of the vertical distance VD2 and the length of the horizontal distance HD2) corresponding to the first position relationship between the second fixed object FO2 and the second target point TO2. In this case, the user UR in the rest views the virtual object VO easier in comparison to the embodiment of FIG. 5A since the virtual object VO is positioned according to an initial phase of a posture (e.g., the first sub-posture).

Figure 7B:
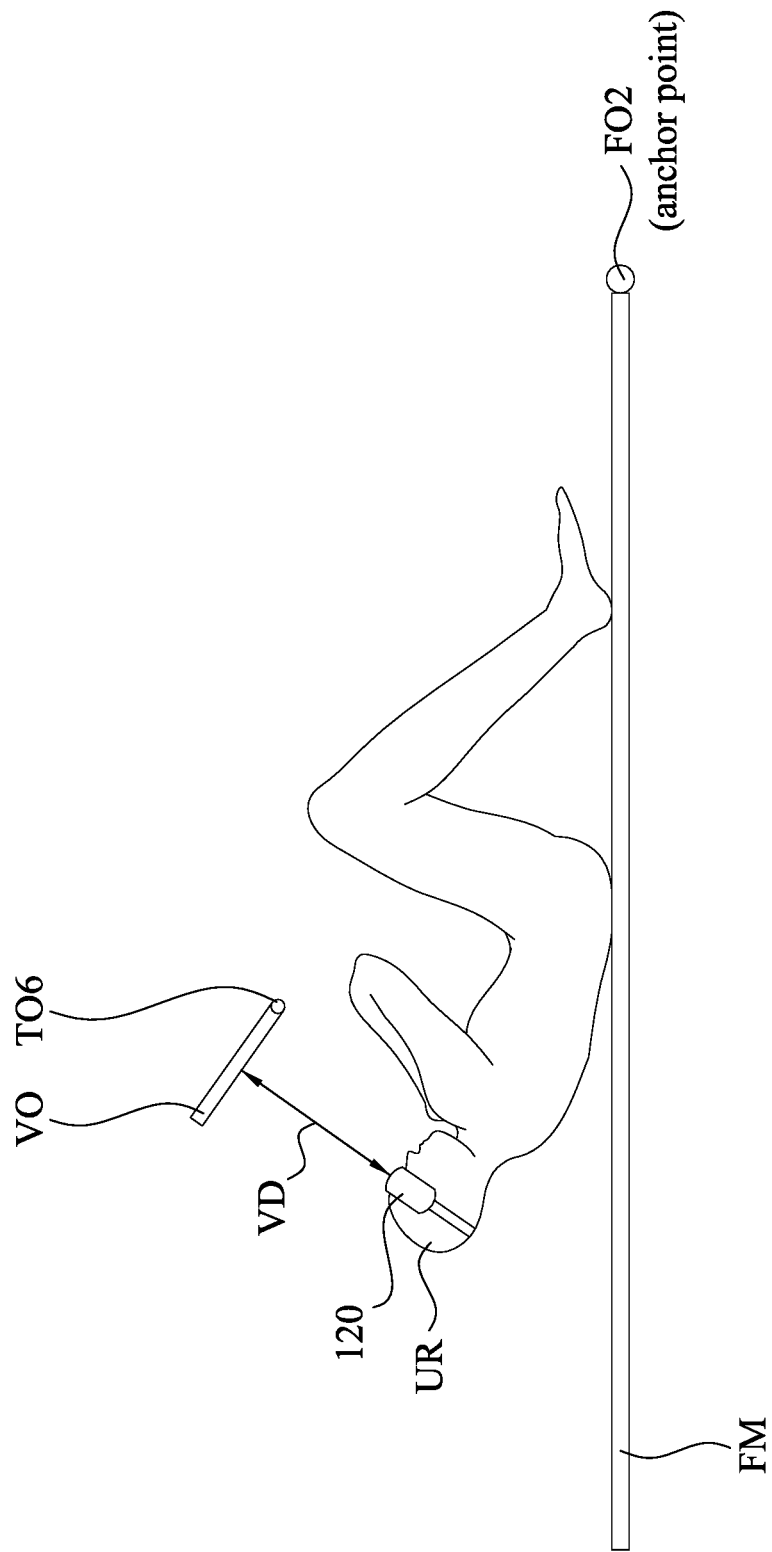
Figure 7C:
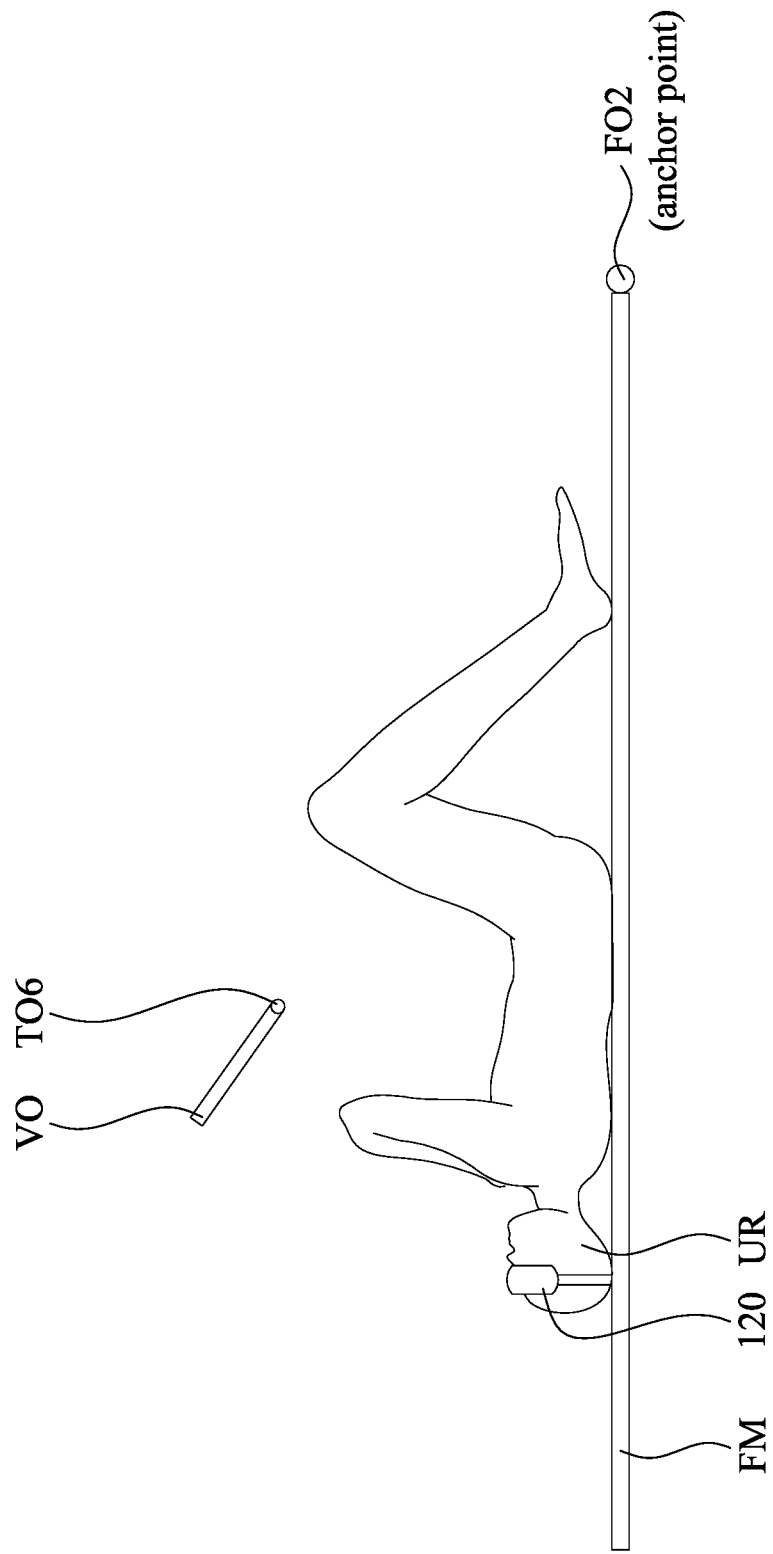
Figure 7D:
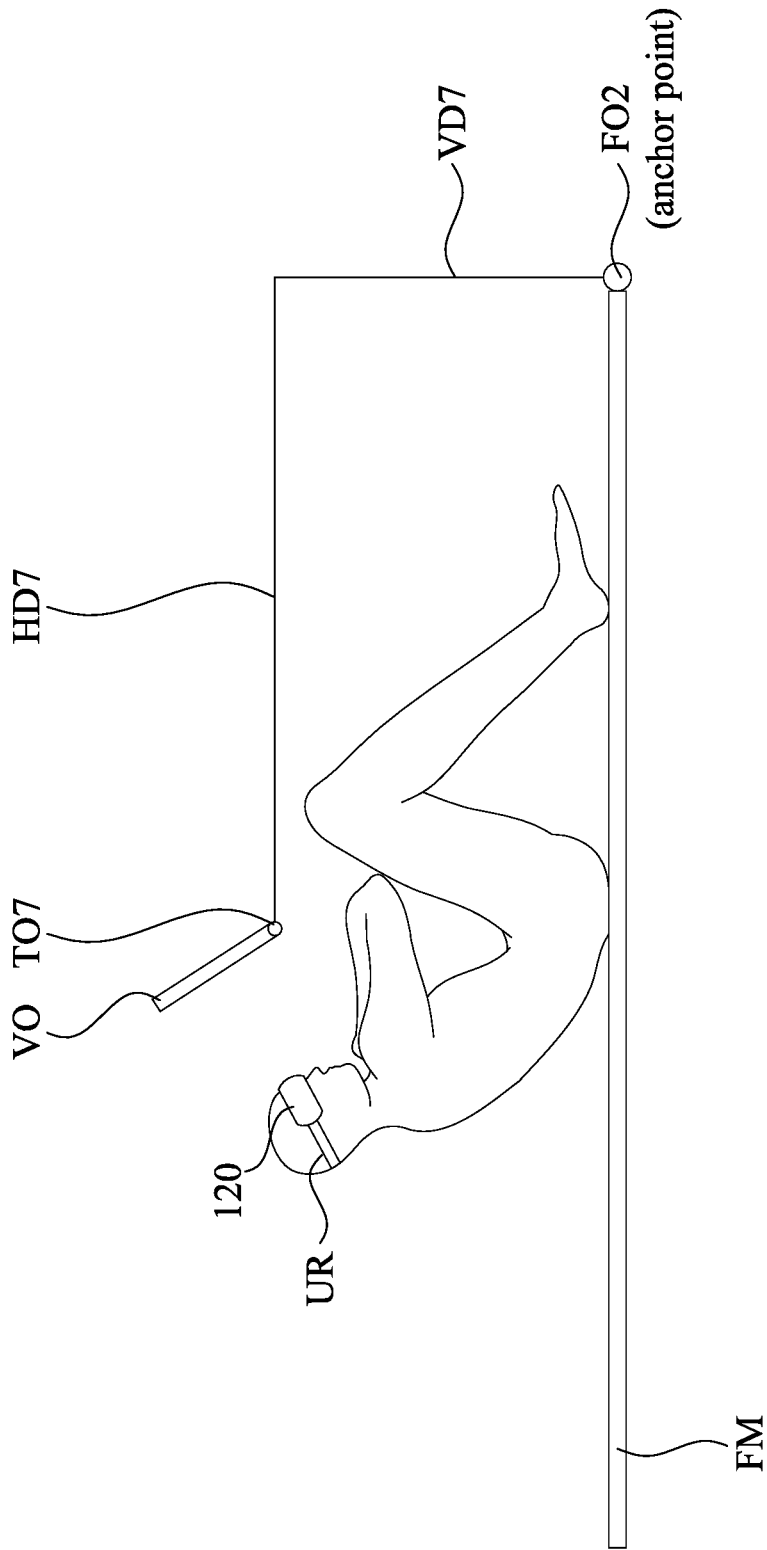

As shown in FIG. 7B, the user UR changes the posture thereof to neither the first sub-posture nor to the second sub-posture, so that the display device 120 is neither at the position of FIG. 7A nor at the position of FIG. 7D. If the display device 120 is neither at the position of FIG. 7A nor at the position of FIG. 7D, the processor 110 controls the display device 120 to display the virtual object VO by following an upward moving track of the head of the user UR or an upward moving track of the display device 120 and by maintaining a predetermined distance from the center between the eyes of the user MR. The processor 110 may utilize the positioning auxiliary device 130 to detect the moving track of the head of the user UR or the display device 120. In some embodiments, the predetermined distance could be the above-described viewing distance VD (as shown in FIG. 7B), or could be a vertical distance from the center between the eyes of the user UR to the center of the virtual object VO. In such way, if the user UR is not capable of doing the second sub-posture in same degree as the main object MO of the second frame VF2, the virtual object VO can still be displayed at the appropriated position for the user UR to view.

In some embodiments, when the virtual object VO is displayed at the predetermined distance from the display device 120, the processor 110 further determines a sixth target point TO6 in the virtual environment. For example, the processor 110 can calculate the position of the display device 120 by controlling the positioning auxiliary device 130 to interact with a marker or a receptor set on the display device 120. Then, the processor 110 can calculate the position of the sixth target point TO6 based on the position of the display device 120, the predetermined distance and the size of the virtual object VO. Accordingly, a sixth position relationship between the sixth target point TO6 and the second fixed object FO2 is calculated.

As shown in FIG. 7C, when the user UR returns to the first sub-posture from the posture of FIG. 7B for trying to achieve the second sub-posture next time, the display device 120 is moved from the position of FIG. 7B back to the position of FIG. 7A. For providing the user to view the virtual object VO comfortably if the user UR still achieves the posture of FIG. 7B next time, the processor 110 controls the display device 120 to display (hold) the virtual object VO at the sixth target point TO6 in the virtual environment by setting the sixth position relationship between the sixth target point TO6 and the second fixed object FO2.

The user UR changes the posture thereof from the first sub-posture for trying to achieve the second sub-posture of FIG. 7D. Before the user UR achieves the posture of FIG. 7B, the processor 110 controls the display device 120 to display the virtual object VO at the sixth target point TO6 in the virtual environment. After the user UR achieves the posture of FIG. 7B, the processor 110 controls the display device 120 to display the virtual object VO by following the upward moving track of head of the user UR (or the display device 120) and by maintaining the predetermined distance from the center between the eyes of the user UR. It can be understood as the virtual object VO is pushed substantially diagonally upward by the user. As shown in FIG. 7D, the user UR achieves the second sub-posture same as the main object MO in the second frame VF2, so that the display device 120 is at the position higher than those in FIGS. 7A-7C. If the user UR achieves the second sub-posture (or the display device 120 is at the position of FIG. 7D), the processor 110 controls the display device 120 to display the virtual object VO at a seventh target point TO7 in the virtual environment by setting a seventh position relationship (i.e., a length of a vertical distance VD7 and a length of a horizontal distance HD7) corresponding to the fifth position relationship (i.e., the length of the vertical distance VD5 and the length of the horizontal distance HD5) between the second fixed object FO2 and the seventh target point TO7.

In some embodiments, the posture of the user UR exceeds the standard of the physical activity. For example, an angle (not shown) between an upper body of the user UR and the exercise mat FM is greater than another angle between an upper body of the main object MO and the accessory object AO corresponding to the second sub-posture as shown in FIG. 6B. In this situation, since the processor 110 once determines that a point of the virtual object VO is overlapped with the seventh target point TO7 corresponding to the fifth target point TO5, the virtual object VO is still displayed at the seventh target point TO7 for informing the user UR that the posture of the user UR achieves the standard.

In sum, the display system 100 of the present disclosure automatically displays the virtual object VO at the appropriated position for the user UR by analyzing the main object MO in the video. In such way, while the user UR is doing the physical activity, the user UR is not required to manually reposition or adjust the virtual object VO.

The disclosed methods, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A display method for displaying a virtual display screen in a virtual environment, comprising:
by at least one processor, recognizing characteristics of a human object from a video to be played by the virtual display screen, wherein the characteristics of the human object are related to a body position of a body of the human object;
by the at least one processor, recognizing a first fixed object on an accessory object from the video;

by the at least one processor, determining a first target point in the video according to the characteristics of the human object, wherein the first target point is a reference point to locate the virtual display screen to be displayed in the virtual environment;

by the at least one processor, calculating a first position relationship between the first fixed object and the first target point;

by the at least one processor, determining an anchor point in the virtual environment; and by the at least one processor, controlling a display device to display the virtual display screen at a second target point in the virtual environment by setting a second position relationship between the anchor point and the second target point, wherein the second position relationship is corresponding to the first position relationship, and the virtual display screen plays the video;

wherein the operation of determining the first target point comprises:

by the at least one processor, setting a reference line as a line between two points on the body of the human object; and by the at least one processor, setting the first target point according to at least a predetermined distance from the reference line.

2. The display method of claim 1, wherein the operation of determining the first target point comprises:

by the at least one processor, determining a position on a viewing direction of the human object, a slant angle and a size of the virtual display screen according to the characteristics of the human object in the video, so as to establish a contour.

3. The display method of claim 2, wherein the operation of determining the position on the viewing direction of the human object, the slant angle and the size of the virtual display screen comprises:

by the at least one processor, determining the slant angle of the virtual display screen according to the reference line;

by the at least one processor, determining the position on the viewing direction of the human object based on the predetermined distance; and by the at least one processor, determining the size of the virtual display screen based on a field of view and the predetermined distance.

4. The display method of claim 3, wherein if the characteristics of the human object move repetitively from a first position to a second position, the operation of setting the reference line comprises:

by the at least one processor, setting a first line according to the characteristics of the human object if the characteristics of the human object are at the first position;

by the at least one processor, setting a second line according to the characteristics of the human object if the characteristics of the human object are at the second position, wherein the first line is intersected by the second line to form an angle;

by the at least one processor, searching a third line that is intersected by and between the first line and the second line, wherein the third line equally divides the angle between the first line and the second line; and by the at least one processor, determining the third line as the reference line.

5. The display method of claim 3, wherein if the human object is a human figure and the characteristics of the human object are a section above shoulders of the human figure, the reference line is set from a first point at a lower end of a neck of the human figure to a second point above a head of the human figure.

6. The display method of claim 1, wherein the at least one processor is configured to control a positioning auxiliary device to perform an interaction operation in a physical environment so that a positioning data is generated, and the at least one processor is configured to identify a second fixed object in the physical environment according to the positioning data and convert a position of the second fixed object into the anchor point in the virtual environment.

7. The display method of claim 1, wherein if the human object changes in posture, the display method further comprises:

by the at least one processor, determining a third target point in the video according to the characteristics of the human object;

by the at least one processor, calculating a third position relationship between the first fixed object and the third target point; and by the at least one processor, controlling the display device to display the virtual display screen at a fourth target point in the virtual environment by setting a fourth position relationship between the anchor point and the fourth target point, wherein the fourth position relationship is corresponding to the third position relationship.

8. The display method of claim 1, wherein if the characteristics of the human object move repetitively from a first position to a second position and the display device is configured to be moved repetitively from a third position to a fourth position according to the movement of the characteristics of the human object, the display method further comprises:

by the at least one processor, determining the first target point in the video if the characteristics of the human object are at the first position;

by the at least one processor, determining a fifth target point in the video if the characteristics of the human object are at the second position;

by the at least one processor, calculating a fifth position relationship between the first fixed object and the fifth target point;

by the at least one processor, controlling the display device to display the virtual display screen at the second target point in the virtual environment if the display device is at the third position;

by the at least one processor, controlling the display device to display the virtual display screen by following an upward moving track of the display device by maintaining the predetermined distance from the user if the display device is neither at the third position nor the fourth position; and by the at least one processor, controlling the display device to display the virtual display screen at a seventh target point in the virtual environment by setting a seventh position relationship between the anchor point and the seventh target point if the display device is at the fourth position, wherein the seventh position relationship is corresponding to the fifth position relationship.

9. The display method of claim 8, further comprising:

by the at least one processor, determining a sixth target point in the virtual environment if the virtual display screen is displayed by following the upward moving track of the display device; and by the at least one processor, controlling the display device to display the virtual display screen at the sixth target point in the virtual environment if the display device is moved from a position which is neither the third position nor the fourth position back to the third position.

10. The display method of claim 1, wherein the two points on the body of the human object are between a shoulder and a back of a head of the body of the human object.

11. A display system, comprising:
a display device configured to display a virtual display screen in a virtual environment; and
at least one processor coupled to the display device and configured to:
recognize characteristics of a human object from a video to be played by the virtual display screen, wherein the characteristics of the human object are related to a body position of a body of the human object;
recognize a first fixed object on an accessory object from the video;
determine a first target point in the video according to the characteristics of the human object, wherein the first target point is a reference point to locate the virtual display screen to be displayed in the virtual environment;
calculate a first position relationship between the first fixed object and the first target point;
determine an anchor point in the virtual environment; and
control the display device to display the virtual display screen at a second target point in the virtual environment by setting a second position relationship between the anchor point and the second target point, wherein the second position relationship is corresponding to the first position relationship, and the virtual display screen plays the video;
wherein the at least one processor is configured to:
set a reference line as a line between two points on the body of the human object; and
set the first target point according to at least a predetermined distance from the reference line.

12. The display system of claim 11, wherein the at least one processor is configured to determine a position on a viewing direction of the human object, a slant angle and a size of the virtual display screen according to the characteristics of the human object in the video, so as to establish a contour.

13. The display system of claim 12, wherein the at least one processor is configured to:
determine the slant angle of the virtual display screen according to the reference line;
determine the position on the viewing direction of the human object based on the predetermined distance; and
determine the size of the virtual display screen based on a field of view and the predetermined distance.

14. The display system of claim 13, wherein if the characteristics of the human object move repetitively from a first position to a second position, the at least one processor is configured to:
set a first line according to the characteristics of the human object if the characteristics of the human object are at the first position;
set a second line according to the characteristics of the human object if the characteristics of the human object are at the second position, wherein the first line is intersected by the second line to form an angle;
search a third line that is intersected by and between the first line and the second line, wherein the third line equally divides the angle between the first line and the second line; and
determine the third line as the reference line.

15. The display system of claim 11, further comprising a positioning auxiliary device configured to perform an interaction operation in a physical environment so that a positioning data is generated, wherein the at least one processor is configured to identify a second fixed object in the physical environment according to the positioning data and convert a position of the second fixed object into the anchor point in the virtual environment.

16. The display system of claim 11, wherein if the human object changes in posture, the at least one processor is further configured to:
determine a third target point in the video according to the characteristics of the human object;
calculate a third position relationship between the first fixed object and the third target point; and
control the display device to display the virtual display screen at a fourth target point in the virtual environment by setting a fourth position relationship between the anchor point and the fourth target point, wherein the fourth position relationship is corresponding to the third position relationship.

17. The display system of claim 11, wherein if the characteristics of the human object move repetitively from a first position to a second position and the display device is configured to be moved repetitively from a third position to a fourth position according to the movement of the characteristics of the human object, the at least one processor is further configured to:
determine the first target point in the video if the characteristics of the human object are at the first position;
determine a fifth target point in the video if the characteristics of the human object are at the second position;
calculate a fifth position relationship between the first fixed object and the fifth target point;
control the display device to display the virtual display screen at the second target point in the virtual environment if the display device is at the third position;
control the display device to display the virtual display screen by following an upward moving track of the display device and by maintaining the predetermined distance from the user if the display device is neither at the third position nor the fourth position; and
control the display device to display the virtual display screen at a seventh target point in the virtual environment by setting a seventh position relationship between the anchor point and the seventh target point if the display device is at the fourth position, wherein the seventh position relationship is corresponding to the fifth position relationship.

18. The display system of claim 17, wherein the at least one processor is further configured to:
determine a sixth target point in the virtual environment if the virtual display screen is displayed by following the upward moving track of the display device; and
control the display device to display the virtual display screen at the sixth target point in the virtual environment if the display device is moved from a position which is neither the third position nor the fourth position back to the third position.

19. A non-transitory computer readable storage medium with a computer program to execute a display method for displaying a virtual display screen in a virtual environment, wherein the display method comprises:

by at least one processor, recognizing characteristics of a human object from a video to be played by the virtual display screen, wherein the characteristics of the human object are related to a body position of a body of the human object;

by the at least one processor, recognizing a first fixed object on an accessory object from the video;

by the at least one processor, determining a first target point in the video according to the characteristics of the human object, wherein the first target point is a reference point to locate the virtual display screen to be displayed in the virtual environment;

by the at least one processor, calculating a first position relationship between the first fixed object and the first target point;

by the at least one processor, determining an anchor point in the virtual environment; and by the at least one processor, controlling a display device to display the virtual display screen at a second target point in the virtual environment by setting a second position relationship between the anchor point and the second target point, wherein the second position relationship is corresponding to the first position relationship, and the virtual display screen plays the video;

wherein the operation of determining the first target point comprises:

by the at least one processor, setting a reference line as a line between two points on the body of the human object; and by the at least one processor, setting the first target point according to at least a predetermined distance from the reference line.

\* \* \* \* \*